United States Patent
Neely et al.

US012358372B2

(10) Patent No.: US 12,358,372 B2
(45) Date of Patent: Jul. 15, 2025

(54) INTELLIGENT VEHICLE SYSTEMS AND CONTROL LOGIC FOR AUTOMATED THERMAL EVENT MITIGATION IN ENCLOSED AREAS

(71) Applicant: GM GLOBAL TECHNOLOGY OPERATIONS LLC, Detroit, MI (US)

(72) Inventors: Matthew Neely, Rochester Hills, MI (US); Eric T. Hosey, Royal Oak, MI (US); Matthew E. Gilbert-Eyres, Rochester Hills, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 382 days.

(21) Appl. No.: 17/959,667

(22) Filed: Oct. 4, 2022

(65) Prior Publication Data
US 2024/0109420 A1    Apr. 4, 2024

(51) Int. Cl.
*B60L 3/00* (2019.01)
*B60L 3/04* (2006.01)
*B60Q 1/52* (2006.01)
*B60Q 5/00* (2006.01)
(Continued)

(52) U.S. Cl.
CPC .............. *B60L 3/0046* (2013.01); *B60L 3/04* (2013.01); *B60Q 1/52* (2013.01); *B60Q 5/005* (2013.01); *H01M 10/482* (2013.01); *H01M 10/486* (2013.01); *H01M 50/581* (2021.01); *H01M 2200/10* (2013.01); *H01M 2220/20* (2013.01)

(58) Field of Classification Search
CPC .. B60L 3/0046; B60L 3/04; B60L 3/12; B60L 58/10; B60L 58/12; B60L 58/24; B60L 58/26; B60Q 1/52; B60Q 5/005; H01M 10/482; H01M 10/486; H01M 50/581; H01M 2200/10; H01M 2220/20
See application file for complete search history.

(56) References Cited

U.S. PATENT DOCUMENTS

| 4,350,026 A | 9/1982 | Klein |
| 6,889,515 B2 | 5/2005 | Tilton et al. |
| 6,955,063 B2 | 10/2005 | Adiga et al. |

(Continued)

*Primary Examiner* — Russell Frejd
*Assistant Examiner* — Ana D Thomas
(74) *Attorney, Agent, or Firm* — Quinn IP Law

(57) ABSTRACT

Presented are intelligent vehicle systems for thermal event mitigation for enclosed vehicles, methods for making/using such systems, and vehicles equipped with such intelligent control systems. A method of operating a host vehicle includes a resident or remote vehicle controller verifying the host vehicle is stationary; if stationary, the controller detects a predicted onset or occurrence of a thermal event in at least one cell in the vehicle's battery system. Responsive to the detected thermal event, the controller calculates a vehicle parked in enclosed space (VPES) confidence value predictive of the host vehicle being at least partially enclosed, and determines if this VPES confidence value is greater than a preset minimum confidence level. Responsive to the detected thermal event and the VPES confidence value exceeding the minimum confidence level, the controller transmits a command signal to a resident vehicle subsystem to execute a vehicle control operation that mitigates the thermal event.

20 Claims, 2 Drawing Sheets

(51) Int. Cl.
    *H01M 10/48*     (2006.01)
    *H01M 50/581*    (2021.01)

(56)                  References Cited

U.S. PATENT DOCUMENTS

| | | |
|---|---|---|
| 8,329,325 B2 | 12/2012 | Brodie et al. |
| 8,383,260 B2 | 2/2013 | Essinger et al. |
| 8,429,899 B2 | 4/2013 | Gonze et al. |
| 8,435,668 B2 | 5/2013 | Kumar et al. |
| 8,563,154 B2 | 10/2013 | Graban et al. |
| 8,852,772 B2 | 10/2014 | McDonald |
| 8,951,654 B2 | 2/2015 | Sachdev et al. |
| 9,193,232 B2 | 11/2015 | Huntzicker |
| 9,196,939 B2 | 11/2015 | Christian et al. |
| 9,689,624 B2 | 6/2017 | Timmons et al. |
| 9,851,654 B2 | 12/2017 | Bryant et al. |
| 10,270,123 B2 | 4/2019 | Schilder et al. |
| 10,923,287 B1 | 2/2021 | Coppola et al. |
| 11,167,643 B2 | 11/2021 | Li et al. |
| 2009/0249807 A1 | 10/2009 | Nemesh et al. |
| 2011/0200860 A1 | 8/2011 | Brodie et al. |
| 2016/0090105 A1* | 3/2016 | Neubecker ............ B60W 50/14 |
| 2019/0357386 A1 | 11/2019 | Coppola et al. |
| 2020/0164763 A1* | 5/2020 | Holme .................. B60L 58/16 |
| 2021/0143652 A1 | 5/2021 | Ressler et al. |
| 2021/0234209 A1 | 7/2021 | Wang et al. |
| 2022/0097562 A1 | 3/2022 | Li et al. |
| 2022/0102780 A1 | 3/2022 | Hickey et al. |
| 2024/0030544 A1* | 1/2024 | Yoon ................... H01M 50/249 |
| 2024/0252861 A1* | 8/2024 | Sandmann .............. A62C 3/07 |
| 2024/0283083 A1* | 8/2024 | Ke ....................... H01M 50/244 |
| 2024/0291055 A1* | 8/2024 | Cortes ................. H01M 50/204 |
| 2024/0313291 A1* | 9/2024 | Williams .............. B32B 7/027 |
| 2024/0313300 A1* | 9/2024 | Williams ............ H01M 10/658 |
| 2024/0313301 A1* | 9/2024 | Williams ............ H01M 50/249 |

\* cited by examiner

INTELLIGENT VEHICLE SYSTEMS AND CONTROL LOGIC FOR AUTOMATED THERMAL EVENT MITIGATION IN ENCLOSED AREAS

INTRODUCTION

The present disclosure relates generally to electrochemical devices. More specifically, aspects of this disclosure relate to smart vehicle systems and control logic for detecting and responding to severe thermal events in rechargeable traction battery packs.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds and ranges, contemporary traction battery packs group multiple battery cells (e.g., 8-16+ cells/stack) into individual battery modules (e.g., 10-40+ modules/pack) that are electrically interconnected and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

The individual cells of a battery pack may generate a significant amount of heat during the pack's charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise and may push the battery assembly towards an unstable state. Such thermal events, if left unchecked, may lead to a more accelerated heat-generating state called "thermal runaway", a condition in which the battery system is incapable of returning the internal battery components to normal operating temperatures. An integrated battery cooling system may be employed to prevent these undesirable overheating conditions within such battery packs. Active thermal management (ATM) systems, for example, employ a central controller or dedicated control module to regulate operation of a cooling circuit that circulates coolant fluid through the heat-producing battery components. For indirect liquid cooling systems, a heat-transfer coolant is circulated through a network of internal channels and pipes within the battery case. In contrast, direct liquid cooling systems—or "liquid immersion cooling" (LIC) systems—immerse the battery cells within a direct-conduction liquid dielectric coolant.

SUMMARY

Presented herein are intelligent vehicle systems with attendant control logic for automating thermal event mitigation for enclosed vehicles, methods for manufacturing and methods for operating such systems, and motor vehicles equipped with such intelligent control systems. For example, intelligent vehicle systems are disclosed for predicting the onset of a thermal runaway (TR) event in one or more battery cells of an in-vehicle battery pack while detecting a vehicle parked in enclosed space (VPES) scenario. The onboard vehicle sensing and control network may monitor for and sense an oncoming or active TR event while concurrently sensing the vehicle has come to a stop and is at least partially enclosed by a surrounding structure (e.g., open or closed garage, carport, barn, etc.). To determine vehicle proximity to an enclosure, in-vehicle and networked sensing devices generate data that is analyzed to predict a VPES scenario, including without limitation: (1) time of day; (2) duration ignition is off; (3) ambient light sensing; (4) real-time vehicle location data (e.g., proximity to home address, work address, other recognized addresses, etc.); (5) vehicle Wi-Fi connected to recognized Wi-Fi network; (6) detected presence of or vehicle connection to recognized internet of things (IoT) device; and (7) connection to wireless garage door opener and status of garage (e.g., open, closed, duration open, etc.). These parameters may be weighted, aggregated, and compared to a threshold minimum confidence value to derive a predicted confidence that is indicative of the likelihood of a VPES scenario. VPES detection may be confirmed by a vehicle user or, alternatively, may be input by a user. Upon detection of a TR event for a host vehicle in a VPES scenario, the vehicle automates remediating actions to mitigate the event.

Attendant benefits for at least some of the disclosed concepts include smart control systems and programmable logic that provision thermal event detection and mitigation with a concomitant prediction that a host vehicle is in an at least partially enclosed area. Establishing host vehicle location and enclosure proximity during a thermal runaway event allows the vehicle users and building occupants to safely vacate the area and enables first responders to appropriately prepare for and respond to the exigent situation. The host vehicle, either directly or through a third-party vehicle service provider, may also broadcast visual and/or audible alerts to help bystanders clear the area as they may not be aware of the oncoming/active thermal runaway event.

Aspects of this disclosure are directed to vehicle control systems, system control logic, and memory-stored instructions for mitigating thermal events during a VPES scenario. In an example, a method is presented for operating a host vehicle with a resident, remote, or network of resident/remote vehicle controllers (collectively "controller") and a battery system having multiple battery cells. This representative method includes, in any order and in any combination with any of the above and below disclosed options and features: verifying, e.g., via the vehicle controller communicating with a PCM or Range Circuit (PRNDL) Sensor, the host vehicle is in a stationary state; detecting, e.g., via the vehicle controller communicating with an EBCM after verifying the host vehicle is parked, idling, off, or otherwise stationary, a predicted onset or occurrence of a thermal event in at least one cell of the vehicle's battery system; determining, e.g., via the vehicle controller communicating with a distributed network of resident/remote sensing devices responsive to detecting the thermal event, a VPES confidence value that is predictive of the host vehicle being located in an at least partially enclosed area; determining if this VPES confidence value is greater than a memory-stored predefined minimum confidence level; and transmitting, e.g., via the vehicle controller responsive to the detected thermal event and the VPES confidence value exceeding the minimum confidence level, one or more command signals to one or more resident vehicle subsystems of the host vehicle to execute one or more vehicle control operations designed to mitigate the thermal event.

Aspects of this disclosure are also directed to computer-readable media (CRM) for mitigating thermal events during a VPES scenario. In an example, a non-transitory CRM stores instructions executable by one or more processors of a resident or remote vehicle controller or controller network. These instructions, when executed by the processor(s), cause the controller to perform operations, including: verifying the host vehicle is in a stationary state; detecting, after verifying the host vehicle is in the stationary state, a predicted onset or occurrence of a thermal event in at least one of the battery cells of the vehicle battery system; determining, responsive to detecting the thermal event, a VPES confidence value predictive of the host vehicle being located in an at least partially enclosed area; determining if the VPES confidence value is greater than a predefined minimum confidence level; and transmitting, responsive to determining the VPES confidence value is greater than the predefined minimum confidence level, a command signal to a resident vehicle subsystem of the host vehicle to execute a vehicle control operation configured to mitigate the thermal event.

Additional aspects of this disclosure are directed to motor vehicles with intelligent vehicle systems executing control logic for mitigating thermal events during VPES scenarios. As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive applications, one or more electric traction motors operate alone (e.g., for FEV powertrains) or in conjunction with an internal combustion engine (e.g., for HEV powertrains) to selectively drive one or more of the road wheels to propel the vehicle. A rechargeable traction battery pack containing multiple battery cells is mounted onto the vehicle body and operable to power the traction motor(s).

Continuing with the preceding discussion, the vehicle is also equipped with a vehicle controller (e.g., single controller, network of controllers, resident/remote controller devices, etc.) that is programmed to verify the vehicle is in a stationary state and, once verified, thereafter detect a future (medium-level) or an active (high-level) thermal event in one or more of the battery cells. Upon detection of a thermal event, the controller responsively calculates a VPES confidence value that is predictive of the vehicle being in an at least partially enclosed area, and concurrently determines if this VPES confidence value exceeds a memory-stored minimum confidence level. If a thermal event is detected and the VPES confidence value exceeds the minimum confidence level, the controller commands at least one resident vehicle subsystem to execute at least one vehicle control operation to mitigate the thermal event.

For any of the disclosed systems, methods, and vehicles, the vehicle controller may respond to the host vehicle being in a stationary state by initializing an allocated data buffer within a resident or remote memory device, and concurrently writing VPES-related vehicle parameter data to the allocated data buffer. In this instance, the VPES confidence value is based, in whole or in part, on the VPES-related vehicle parameter data stored in and retrieved from the allocated data buffer. Before the host vehicle is in a stationary state, a stream of VPES-related vehicle parameter data may be accumulated on a rolling basis (e.g., first-in, first-out (FIFA) queue) within a sliding window buffer (e.g., a 2-min rolling buffer with fixed storage capacity). After initializing the allocated data buffer for the now-stationary vehicle (e.g., when ignition keyed-off by vehicle operator), the sliding window buffer is temporarily frozen and the VPES-related vehicle parameter data contained at that time is retrieved for writing into the allocated buffer data. The stationary state may include the host vehicle being in an idle state, a parked state, or an off state.

For any of the disclosed systems, methods, and vehicles, a weighted numerical value may be applied to each parameter within the VPES-related vehicle parameter data (e.g., a first set of (low-level) parameters assigned a first weighted value (e.g., 1), a second set of (medium-level) parameters assigned a second weighted value (e.g., 2), a third set of (high-level) parameters assigned a third weighted value (e.g., 3), and so on). In this instance, the VPES confidence value is calculated as the mathematical sum of the weighted numerical values of the true/positive parameters contained in the VPES-related vehicle parameter data. Parameter weighting may be dynamically adjusted based on relevant driver-use data, crowd-sourced data, host vehicle-specific data, etc. As another option, the vehicle controller may respond to the VPES confidence value exceeding the minimum confidence level by transmitting an electronic notification to a remote host vehicle service (e.g., ONSTAR®), informing it of the thermal event and providing VPES-related information. On the other hand, if the VPES confidence value does not exceed the minimum confidence level, the vehicle controller may transmit a different electronic notification to the remotely located host vehicle service, informing it of the thermal event but not including any VPES-related information.

For any of the disclosed systems, methods, and vehicles, the predefined minimum confidence level may be preset in vehicle memory to a vehicle-calibrated default minimum confidence level; this preset minimum confidence level may thereafter be modified from the default minimum confidence level based on historical use data for the host vehicle (e.g., driver use patterns, past false positives, etc.). In lieu of executing VPES confidence evaluation, the vehicle controller may receive, e.g., from a driver, occupant, or other vehicle user, a VPES input declaring the host vehicle is in fact located in an at least partially enclosed area. In this instance, a command signal may be transmitted to a resident vehicle subsystem upon receipt of the user-selected VPES input and detection of the thermal event. As another option, a detected thermal event may take on various forms, including a thermal runaway event in which at least one of the battery cells is in an uncontrolled heat-generating cycle that is causing an unstable, self-heating state within the vehicle battery system.

For any of the disclosed systems, methods, and vehicles, the resident vehicle subsystem may include one or more electrical contactors that selectively connect/disconnect the vehicle's battery system to/from a high-voltage electrical system of the host vehicle. In this instance, the control operation may include opening the electrical contactor(s) to thereby electrically disconnect the battery system from the HV electrical system. As another option, the resident vehicle subsystem may include a lighting component (e.g., headlamps) and/or an audio component (e.g., vehicle horn) of the host vehicle. In this instance, the control operation may include the lighting component and/or the audio component outputting a predefined visible/audible output that alerts individuals proximal the host vehicle of the thermal event. As yet another option, the resident vehicle subsystem may include a telematics unit that is located inside the host vehicle's passenger compartment. In this instance, the control operation may include the telematics unit broadcasting an electronic alert indicative of the thermal event to an owner or recent operator of the host vehicle or any other interested party. As another option, the telematics unit may transmit one or more electronic signals to a WiFi-enabled smart system and/or an IoT device causing the system/device to generate an alert indicative of the thermal event.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
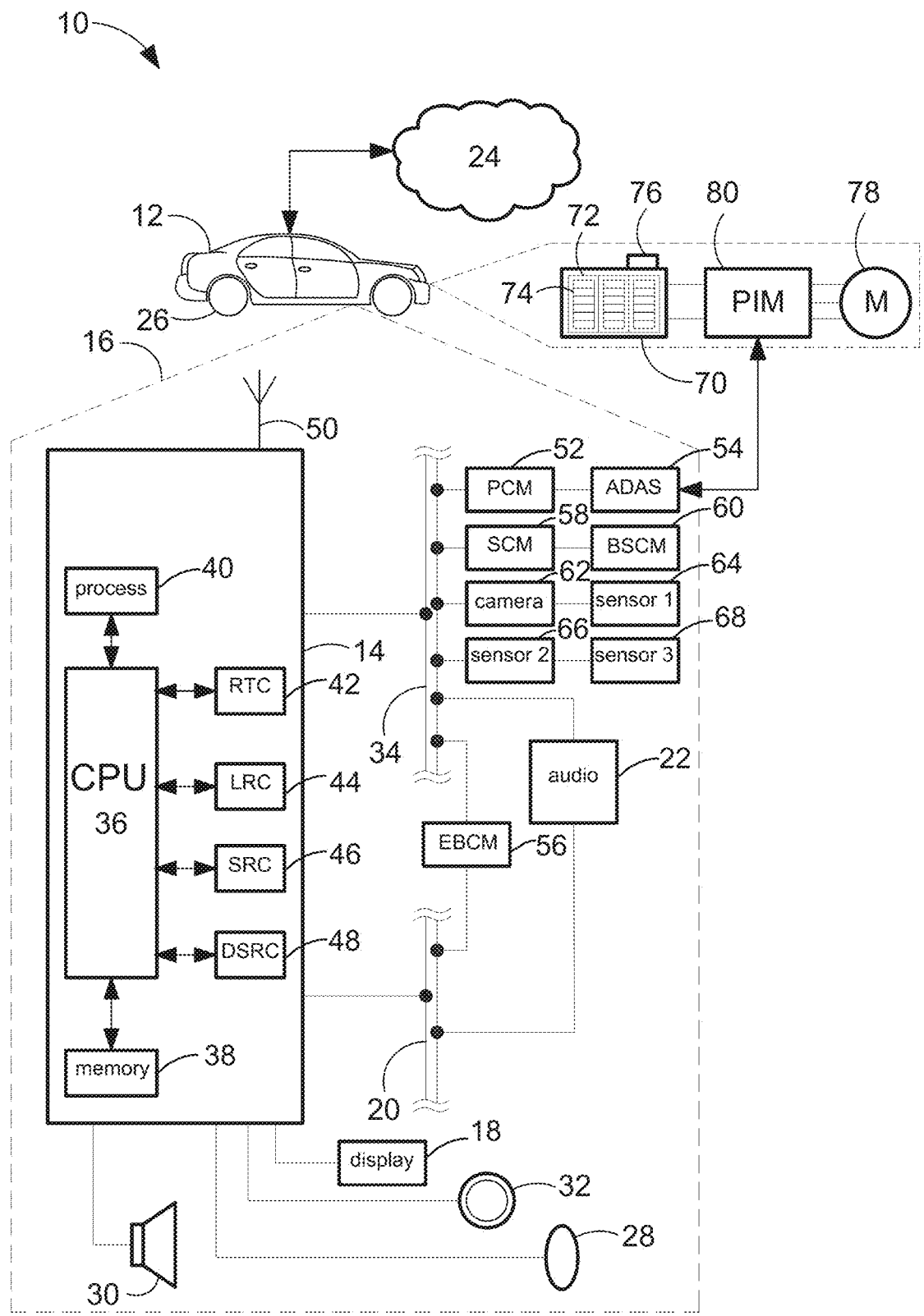
FIG. 1 is a schematic illustration of a representative motor vehicle with an electrified powertrain, a rechargeable traction battery pack, and a network of in-vehicle controllers, sensing devices, and communication devices for automating thermal event detection and mitigation in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain should also be appreciated as a non-limiting implementation of disclosed features. As such, it will be understood that aspects and features of this disclosure may be applied to other powertrain architectures, may be incorporated into any logically relevant type of vehicle, and may be employed for various types of VPES scenarios (e.g., open-type and closed-type garage structures, carports, pole barns, building-gap and confined-alley parking, etc.). Moreover, only select components of the motor vehicle and intelligent vehicle control system are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as body control module (BCM), an engine control module (ECM), a Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless internet protocol (IP) modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor (M) 78 that is operatively connected to a rechargeable energy storage system (RESS), which may be in the nature of a chassis-mounted traction battery pack 70. The traction battery pack 70 is generally composed of one or more battery modules 72 each containing a cluster or stack of battery cells 74, such as lithium-class, zinc-class, nickel-class, or organosilicon-class cells of the pouch, can, or cylindrical type. One or more electric machines, such as traction motor/generator (M) unit(s) 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains. The battery pack 70 may be designed such that module management, cell sensing, module-to-module and/or module-to-host communication functionality, etc., is integrated directly into each battery module 72 and performed by an integrated electronics package, such as a wireless-enabled cell monitoring unit (CMU) 76.

Under anomalous operating conditions, the battery pack 70 may become damaged or may malfunction in a manner that causes the cells 74 inside the battery modules 72 to generate excessive heat, sometimes in excess of 400-500° C. This thermal event may be in the nature of a thermal runaway event in which one or more of the electrochemical battery cells has undergone an internal failure and, thus, entered into an uncontrolled heat-generating cycle that causes an unstable self-heating state within the cell(s). A measured temperature spike within the cells 74 of the battery pack 70, in which an in-pack ATM cooling system is unable to control, may be indicative of a thermal runaway event. It is within the scope of this disclosure that a "thermal event" may include a TR event and/or other temperature-based events within a battery system (e.g., cooling resistance faults, internal thermal resistance faults, etc.). Moreover, any of an assortment of different techniques may be employed for detecting a thermal event within a traction battery pack, some examples of which are described in U.S. Pat. No. 8,429,899 B2, to Gonze et al., and U.S. Patent App. Pub. Nos. 2021/0234209 A1, to Wang et al., 2021/0143652 A1, to Ressler et al., and 2022/0097562 A1, to Li et al. All of the foregoing patent documents are incorporated herein by reference in their respective entireties and for all purposes.

Discussed below are intelligent vehicle systems with attendant control logic for automating thermal event detection and mitigation during a VPES scenario. In a non-limiting example, systems and methods intuitively alert nearby bystanders and interested third-party entities of a predicted or active thermal runaway event. Using an in-vehicle network of input, sensor, and communication devices to accumulate an assortment of VPES-related data, the host vehicle predicts whether or not it is in an enclosed space upon detection of the thermal event. As used herein, the term "enclosed" may be defined to include both fully surrounded scenarios (e.g., vehicle parked in a closed residential garage or pole barn) and partially surrounded scenarios (e.g., vehicle parked under carport or open-type residential garage). If a VPES scenario is predicted after detection of a thermal event, vehicle location and type data, enclosure proximity and type data, thermal event data, etc., is communicated to first responders. At the same time, a thermal event alert may be broadcast to a vehicle owner, nearby bystanders, occupants of an adjoining building, etc. TR-in-VPES notifications may be output through an assortment of different modalities.

Predicting whether or not a subject host vehicle is parked in an enclosed space during a severe thermal event may be based on any one or more or combination of the following VPES-related parameters: (1) current time of day and previously established enclosed park time(s); (2) real-time vehicle location and previously established enclosure locations (e.g., home location, work location, parking garage location, etc.); (3) ignition off and duration ignition is off; (4) surrounding environment detection (e.g., proximity sensors, vehicle cameras, radar, lidar, etc.); (5) ambient lighting (e.g., resident vehicle light sensors); (6) detection of or wireless connection to nearby network (e.g., identify or pair with available external Wi-Fi network); (7) detection of or wireless connection to IoT devices (e.g., home assistant device, home security system, smart appliance, smart lighting, etc.); (8) detection of or wireless connection to a wireless-enabled garage door system (e.g., HOMELINK®). Each of the foregoing parameters may be weighted based on available empirical data as more or less indicative of a VPES scenario.

Figure 2:
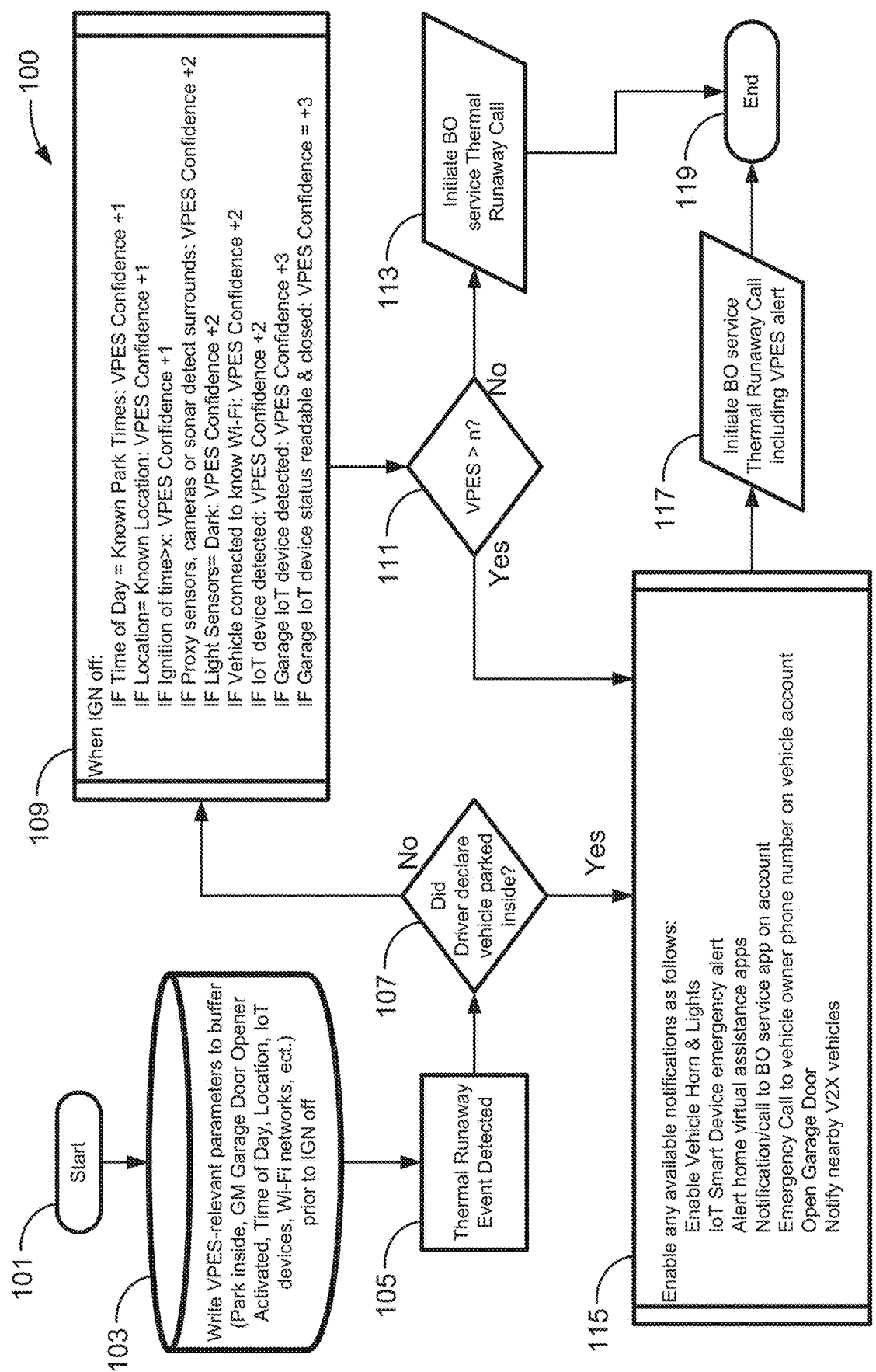
FIG. 2 is a flowchart illustrating a representative VPES control protocol for detecting and mitigating thermal events in a host vehicle located in an enclosed space, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for automated thermal event sensing and mitigation of a host vehicle, such as automobile 10 of FIG. 1, during a VPES scenario, such as parking in a residential garage, is generally described at 100 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 and/or cloud computing service 24 of FIG. 1), to perform any or all of the above and below described functions associated with the disclosed concepts. It should be recognized that the order of execution of the illustrated operation blocks may be changed, additional operation blocks may be added, and some of the herein described operation blocks may be modified, combined, or eliminated.

Method 100 begins at START terminal block 101 of FIG. 2 with memory-stored, processor-executable instructions for a programmable controller or control module or similarly suitable processor to call up an initialization procedure for a VPES control protocol. This routine may be executed in real-time, near real-time, continuously, systematically, sporadically, and/or at regular intervals, for example, each 10 or 100 milliseconds during regular and routine operation of the motor vehicle 10. As yet another option, terminal block 101 may initialize responsive to a user command prompt (e.g., via input controls 32), a resident vehicle controller prompt (e.g., from CPU 36 or EBCM 56), or a broadcast prompt signal received from a centralized back-office (BO) vehicle services system (e.g., host cloud computing service 24). By way of non-limiting example, the method 100 may automatically initialize in response to detection of a user keying-off the host vehicle, parking and vacating the host vehicle, idling the host vehicle in one location for a prolonged period of time, or manually or audibly selecting a VPES option for the host vehicle prior to or after vacating the passenger cabin. Upon completion of some or all of the control operations presented in FIG. 2, the method 100 may advance to END terminal block 119 and temporarily terminate or, optionally, may loop back to terminal block 101 and run in a continuous loop.

In a specific, yet non-limiting use case scenario, a designated vehicle control module (e.g., EBCM 56 and CPU 36) may be pinged to actively monitor for TR and VPES upon verifying that the subject host vehicle is in a stationary state. Verifying a stationary state may include receiving idle state feedback data from one or more vehicle dynamics sensor, parked state feedback data from an electronic shift knob/dial, off state feedback data from a PCM, etc. Before the host vehicle transitions into a stationary state, a stream of VPES-related vehicle parameter data may be accumulated on a rolling basis (e.g., first-in, first-out (FIFA) queue) from an in-vehicle network of input, sensor, and communication devices (e.g., FIG. 1), and stored within a sliding-window data buffer (e.g., a 2-min rolling buffer with a fixed storage capacity). When the vehicle ignition is turned off (e.g., via a driver manually depressing an ignition start/stop button), the sliding window buffer is provisionally suspended and the VPES-related vehicle parameter data contained therein at that time is retrieved for writing into an allocated data buffer.

From terminal block 101, method 100 advances to WRITE TO BUFFER data storage block 103 to save VPES-related data in readily accessible vehicle memory for use during an ensuing VPES confidence evaluation. By way of example, method 100 may initialize an allocated data buffer within resident vehicle memory after verifying the host vehicle is stationary. In computer science and engineering, a buffer is a reserved segment of memory (e.g., in cache RAM) shared by hardware devices and/or program processes (e.g., that operate at different speeds or with different set priorities) and used to temporarily store data for subsequent transfer and use. A trigger function may be implemented to initialize the allocated memory space as a fielded buffer for predefined content. Upon initialization, VPES-relevant data aggregated before key-off (e.g., above-described information that indicates a vehicle is parked inside an enclosed space) is retrieved from the sliding window buffer and written to the allocated data buffer for subsequent retrieval, as will be described below in the discussion of predefined process block 109.

Method 100 progresses from data storage block 103 to THERMAL EVENT DETECTION process block 105 to determine if a thermal event has occurred or is predicted to occur in at least one of the battery cells of the vehicle battery system while the vehicle is in an enclosed space. In one example, process block 105 may return a positive result (YES) and set a corresponding fault flag in response to forecasting a predicted onset of a TR event in the vehicle battery system (e.g., a medium-level thermal event) after verifying that the host vehicle is idling, parked, off, or otherwise stationary. Additionally or alternatively, process block 105 may return a positive result (YES) and set a corresponding fault flag in response to sensing an active TR event in the vehicle battery system (e.g., a high-level thermal event) after verifying that the host vehicle is stationary. If a thermal event is not detected, method 100 may continue to monitor for a thermal event at process block 105 until one is detected or the vehicle is shifted into gear, moved, keyed on, or otherwise no longer stationary. For the latter, method 100 may proceed to terminal block 119 and temporarily end.

With continuing reference to FIG. 2, the method 100 responds to detection of a thermal event at process block 105 by attempting to determine whether or not the host vehicle is presently in a VPES situation. At USER VPES INPUT decision block 107, for example, method 100 determines whether or not a recent driver, occupant, owner, or other user of the host vehicle has declared that the host vehicle has come to a stop and is at least partially enclosed by a surrounding structure. This may include an in-vehicle graphical user interface, such as an electronic instrument panel (EIP) or center-stack telematics unit 14 of FIG. 1, receiving from any suitable input device, such as one of the user input controls 32, a user-selected VPES input indicating that the host vehicle is located in an at least partially enclosed area. Express validation that the host vehicle is presently in a VPES scenario may be achieved by other methods, including via portable computing device, such as a dedicated mobile application (e.g., GM HOMELINK®) operating on a wireless-enabled smartphone, or wired/wireless charging connection to an electric vehicle charging station (EVCS) mounted within a user's garage. Absent an explicit affirmation that the host vehicle is in a VPES scenario (Block 107=NO), method 100 proceeds to predefined process block 109. On the other hand, when the vehicle driver or other vehicle user has declared that the subject vehicle is parked in a fully or partially enclosed area (Block 107=YES), method 100 will execute predefined process block 115.

Without a definitive declaration that the host vehicle is fully or partially surrounded by a nearby structure, the method 100 attempts to predict whether or not the host vehicle is in an enclosed space. At VPES CONFIDENCE EVALUATION predefined process block 109, for example, a vehicle controller responds to detecting a thermal event for a now-stationary host vehicle by determining a vehicle parked in enclosed space (VPES) confidence value that is predictive of the host vehicle being located in an at least partially enclosed area. In accord with the illustrated example, the memory-stored VPES control protocol detects a thermal runaway event for a deactivated (ignition IGN off) vehicle and automatically retrieves any combination of the VPES-related parameters written to allocated data buffer space at Block 103 and makes the following evaluations:

a) IF present time of day=an established park time: VPES Confidence+1 b) IF real-time vehicle location=an established VPES local: VPES Confidence+1 c) IF ignition off duration>a preset VPES IGN off threshold: VPES Confidence+1 d) IF sensed ambient light<preset no/low light threshold: VPES Confidence+2 e) IF vehicle wireless device=detects or connects to an established Wi-Fi network: VPES Confidence+2 f) IF vehicle wireless device=detects or connects to an established IoT device: VPES Confidence+2 g) IF vehicle proximity sensors, cameras, LiDAR/Radar/sonar, etc., detect proximal surrounding structure: VPES Confidence+2 h) IF vehicle wireless garage opener=detects or connects to established Smart Garage/IoT device: VPES Confidence+3 i) IF readable Smart Garage/IoT device status=closed: VPES Confidence=+3

As indicated above, a weighted numerical value (e.g., +1, +2, +3, . . . +y) may be assigned to each parameter within the VPES-related vehicle parameter data. Parameter weighting may be based, for example, on available empirical data, control testing data, historical use data, experiential data, that suggests a given parameter is more or less indicative of a VPES scenario. Moreover, a parameter's assigned weighting may be dynamically adjusted based on relevant driver-use data, crowd-sourced data, host vehicle-specific data, etc. For the representative process of FIG. 2, the controller-generated VPES confidence value (VPES confidence) is calculated as the mathematical sum of the weighted numerical values of the true/positive parameters within the VPES-related vehicle parameter data. It should be readily appreciated that the number, type, and weighting of parameters used in the VPES confidence evaluation of block 109 may be varied from what is shown and described above.

After determining a VPES confidence value at predefined process block 109, method 100 advances to VPES PREDICTION decision block 111 to determine whether or not this confidence value suggests that the host vehicle is presently located in a partially/fully enclosed area. Decision block 111 of FIG. 2 may include determining if the VPES confidence value is greater than a predetermined minimum confidence level that is stored in resident or remote memory. It may be desirable that the minimum confidence level be stored to resident cache memory as a vehicle-calibrated default minimum confidence level. Optional applications may allow a vehicle user to select or adjust the minimum confidence level. Likewise, the memory-stored predefined minimum confidence level may be incrementally increased or decreased from the default minimum confidence level, e.g., based on historical use data for the host vehicle (e.g., driver use patterns, past false positives, etc.).

Upon determining that a user has not specified that the host vehicle is in a VPES scenario and, at the same time, the VPES confidence value does not exceed the minimum confidence level (Block 107=NO && Block 111=NO), method 100 concludes that the host vehicle is not enclosed and proceeds to TR NO VPES ALERT data output block 113. At this juncture, method 100 responsively notifies one or more first responders—either directly from the host or through a third-party vehicle host service—of a severe thermal event for a stationary but unenclosed vehicle. Since the host vehicle is not presently subject to a VPES scenario, VPES-related information will likely not be included with this alert. By way of example, and not limitation, a center-stack telematics device (e.g., telematics unit 14) within the vehicle 10 may transmit an electronic alert to local law enforcement and/or fire department notifying them that there is an expected/active thermal event and provide related information (e.g., host vehicle's make/model/color, current location, owner information, nature of thermal event, etc.). A vehicle controller (e.g., CPU 36 of FIG. 1) may also, or alternatively, transmit host vehicle and thermal event data (e.g., via the wireless LRC device(s) 44) to a remote subscription-based back-office (BO) vehicle services provider (e.g., cloud computing host service 24) with a request for assistance. After completing data output block 113, method 100 may advance to END terminal block 119 and temporarily terminate.

After receiving a user input declaring that the host vehicle is in a VPES scenario or concluding that the VPES confidence value does exceed the minimum confidence level (Block 107=YES OR Block 111=YES), method 100 concludes that the host vehicle is enclosed and executes either or both of a THERMAL EVENT MITIGATION predefined process block 115 and a TR VPES ALERT data output block 117. Responsive to detecting a thermal event and concluding the host vehicle is enclosed, method 100 may automate control of one or more resident vehicle subsystems to execute one or more vehicle control operations designed to mitigate the thermal event (Block 115) and concurrently notify one or more first responders—either directly or indirectly—of a severe thermal event for a stationary and at least partially surrounded vehicle (Block 117). Because the host vehicle is presently subject to a VPES scenario, the alert transmitted to first responders at Block 117 will likely include VPES-related information, e.g., along with the relevant vehicle data and thermal event data described in the preceding paragraph. After completing the programmed tasks contained in process block 115 and/or data output block 117, method 100 may provisionally cease at terminal block 119.

Predefined process block 115 of FIG. 2 may automate an assortment of different remediating actions to stop or abate the detected thermal event for the enclosed vehicle. For a residential application or similar scenario in which the surrounding structure is part of or adjoins a residential home or commercial building, the host vehicle, either directly or through a BO service, may prompt an IoT smart device (e.g., smart fire alarm system, smart home security system, smart wearable, etc.) to alert occupants of the home/building of the TR event. In a similar regard, the host vehicle/BO service may prompt a home virtual assistant (GOOGLE ASSISTANT®, AMAZON ALEXA®, MICROSOFT CORTANA®, etc.) to issue an audible or visual alert of the TR event with a request that occupants of the home/building vacate the area. An electronic notification (text, SMS, push, etc.) or call may also be output to all smartphone devices, wireless-enabled vehicles, and/or participating mobile applications within a predefined proximity of the host vehicle (e.g., via V2P, V2V, or V2D). The registered owner of the vehicle and/or most recent driver of the host vehicle may also be notified of the thermal event situation.

In addition to broadcasting alerts of the detected thermal event for the enclosed vehicle, process bock 115 may take remediating action to mitigate the severity and any resultant damage of the detected thermal event. For instance, a telematics unit mounted inside the passenger compartment of the automobile 10 may command the PCM 52 to turn off the vehicle (e.g., for an idling or parked-but-running vehicle) and command the BCM to activate the in-vehicle garage door opener to open the garage door (e.g., for a host vehicle in a closed residential garage). Another non-limiting example may include the Electronic Battery Control Module 56 opening one or more of the electrical contactors that function to selectively connect/disconnect the traction battery pack 70 to/from the vehicle's high-voltage (HV) electrical system. In so doing, the EBCM 56 electrically disconnects the electrical contactor(s) to thereby break the electrical connection between the battery system from the HV electrical system. As another option, a vehicle Light Control Module (LCM) or the vehicle Body Control Module may selectively activate a vehicle lighting component (e.g., headlamps) and/or a vehicle audio component (e.g., vehicle horn) to output a predefined visible and/or audible output designed to alert occupants of the tow vehicle of the thermal event.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a host vehicle with a vehicle controller and a vehicle battery system having multiple battery cells, the method comprising:
   verifying, via the vehicle controller, the host vehicle is in a stationary state;
   detecting, via the vehicle controller after verifying the host vehicle is in the stationary state, a predicted onset or occurrence of a thermal event in at least one of the battery cells of the vehicle battery system;
   determining, via the vehicle controller responsive to detecting the thermal event and verifying the host vehicle is in the stationary state, a vehicle parked in enclosed space (VPES) confidence value predictive of the host vehicle being located in an at least partially enclosed area;
   determining if the VPES confidence value is greater than a predefined minimum confidence level; and
   transmitting, via the vehicle controller responsive to detecting the thermal event and determining the VPES confidence value is greater than the predefined minimum confidence level, a command signal to a resident vehicle subsystem of the host vehicle to execute a vehicle control operation configured to mitigate the thermal event.

2. The method of claim 1, further comprising:
   initializing an allocated data buffer within a vehicle memory device in response to verifying the host vehicle is in the stationary state; and
   writing VPES-related vehicle parameter data to the allocated data buffer, wherein the VPES confidence value is determined using the VPES-related vehicle parameter data.

3. The method of claim 2, further comprising:
   receiving a stream of VPES-related vehicle parameter data on a rolling basis within a sliding window buffer before the host vehicle is in the stationary state; and
   retrieving the VPES-related vehicle parameter data from the sliding window buffer after initializing the allocated data buffer within the vehicle memory device.

4. The method of claim 1, further comprising:
   receiving, via the vehicle controller, VPES-related vehicle parameter data; and
   applying a weighted numerical value to each parameter within the VPES-related vehicle parameter data, wherein the VPES confidence value is determined as a mathematical sum of the weighted numerical values of the parameters within the VPES-related vehicle parameter data.

5. The method of claim 1, further comprising transmitting, via the vehicle controller to a remote host vehicle service responsive to determining the VPES confidence value is greater than the predefined minimum confidence level, a first electronic notification indicative of the thermal event and including a VPES alert containing VPES-related information.

6. The method of claim 5, further comprising transmitting, via the vehicle controller to the remote host vehicle service responsive to determining the VPES confidence value is not greater than the predefined minimum confidence level, a second electronic notification indicative of the thermal event and not including the VPES alert.

7. The method of claim 1, further comprising:
   setting the predefined minimum confidence level within a vehicle memory device to a vehicle-calibrated default minimum confidence level; and
   modifying the predefined minimum confidence level from the vehicle-calibrated default minimum confidence level based on historical use data for the host vehicle.

8. The method of claim 1, further comprising receiving, via the vehicle controller from a user of the host vehicle, a VPES input indicating the host vehicle is located in the at least partially enclosed area, wherein the command signal is also transmitted to the resident vehicle subsystem of the host vehicle in response to receipt of the VPES input.

9. The method of claim 1, wherein the stationary state includes the host vehicle being in any one of an idle state, a parked state, or an off state.

10. The method of claim 1, wherein the thermal event includes a thermal runaway event in which the at least one of the battery cells is in an uncontrolled heat-generating cycle causing an unstable self-heating state.

11. The method of claim 1, wherein the resident vehicle subsystem includes an electrical contactor selectively connecting the vehicle battery system to a high-voltage (HV) electrical system of the host vehicle, and wherein the vehicle control operation includes opening the electrical contactor to thereby electrically disconnect the vehicle battery system from the HV electrical system.

12. The method of claim 1, wherein the resident vehicle subsystem includes a vehicle lighting component and/or a vehicle audio component, and wherein the vehicle control operation includes the vehicle lighting component and/or the vehicle audio component outputting a predefined visible and/or audible output alerting individuals proximal the host vehicle of the thermal event.

13. The method of claim 1, wherein the resident vehicle subsystem includes a telematics unit mounted to the host vehicle, and wherein the vehicle control operation includes the telematics unit transmitting an electronic signal to a WiFi-enabled smart system and/or an internet of things (IoT) device to generate an alert indicative of the thermal event.

14. A non-transitory, computer-readable medium storing instructions executable by one or more processors of a vehicle controller of a host vehicle, the host vehicle including a battery system containing multiple battery cells, the instructions, when executed by the one or more processors, causing the vehicle controller to perform operations comprising:
   verifying the host vehicle is in a stationary state;
   detecting, after verifying the host vehicle is in the stationary state, a predicted onset or occurrence of a thermal event in at least one of the battery cells that causes a failure or fault in the vehicle battery system;

determining, responsive to detecting the thermal event and verifying the host vehicle is in the stationary state, a vehicle parked in enclosed space (VPES) confidence value predictive of the host vehicle being located in an at least partially enclosed area;

determining if the VPES confidence value is greater than a predefined minimum confidence level; and transmitting, responsive to determining the VPES confidence value is greater than the predefined minimum confidence level, a command signal to a resident vehicle subsystem of the host vehicle to execute a vehicle control operation configured to mitigate the thermal event.

15. A motor vehicle, comprising:

a vehicle body with a passenger compartment;

a plurality of road wheels attached to the vehicle body;

a traction motor attached to the vehicle body and operable to drive one or more of the road wheels to thereby propel the motor vehicle;

a vehicle battery system attached to the vehicle body and electrically connected to the traction motor, the vehicle battery system containing multiple battery cells; and a vehicle controller programmed to:

verify the motor vehicle is in a stationary state;

after verifying the motor vehicle is in the stationary state, detect a predicted onset or occurrence of a thermal event in at least one of the battery cells;

responsive to detecting the thermal event and verifying the host vehicle is in the stationary state, determine a vehicle parked in enclosed space (VPES) confidence value predictive of the motor vehicle being located in an at least partially enclosed area;

determine if the VPES confidence value is greater than a predefined minimum confidence level; and responsive to detecting the thermal event and determining the VPES confidence value is greater than the predefined minimum confidence level, transmit a command signal to a resident vehicle subsystem to execute a vehicle control operation configured to mitigate the thermal event.

16. The motor vehicle of claim 15, wherein the vehicle controller is further programmed to:

initialize an allocated data buffer within a vehicle memory device in response to verifying the motor vehicle is in the stationary state; and write VPES-related vehicle parameter data to the allocated data buffer, wherein the VPES confidence value is determined using the VPES-related vehicle parameter data.

17. The motor vehicle of claim 15, wherein the vehicle controller is further programmed to:

receive VPES-related vehicle parameter data; and apply a weighted numerical value to each parameter within the VPES-related vehicle parameter data, wherein the VPES confidence value is determined as a mathematical sum of the weighted numerical values of the parameters within the VPES-related vehicle parameter data.

18. The motor vehicle of claim 15, wherein the vehicle controller is further programmed to:

responsive to determining the VPES confidence value is greater than the predefined minimum confidence level, transmit to a remote host vehicle service a first electronic notification indicative of the thermal event and including a VPES alert containing VPES-related information; and responsive to determining the VPES confidence value is not greater than the predefined minimum confidence level, transmit to the remote host vehicle service a second electronic notification indicative of the thermal event and not including the VPES alert.

19. The motor vehicle of claim 15, wherein the vehicle controller is further programmed to:

set the predefined minimum confidence level to a vehicle-calibrated default minimum confidence level; and modify the predefined minimum confidence level from the vehicle-calibrated default minimum confidence level based on historical use data for the motor vehicle.

20. The motor vehicle of claim 15, wherein the vehicle controller is further programmed to receive, from a user of the motor vehicle, a VPES input indicating the motor vehicle is located in the at least partially enclosed area, wherein the command signal is also transmitted to the resident vehicle subsystem in response to receipt of the VPES input.

* * * * *